(12) United States Patent
Stoll et al.

(10) Patent No.: US 11,933,769 B2
(45) Date of Patent: Mar. 19, 2024

(54) MULTIDIMENSIONAL SAMPLE SEPARATION WITH PRESSURE ADJUSTMENT

(71) Applicant: Agilent Technologies, Inc., Santa Clara, CA (US)

(72) Inventors: Dwight Robert Stoll, Saint Peter, MN (US); Klaus Witt, Keltern (DE); Konstantin Shoykhet, Karlsruhe (DE)

(73) Assignee: Agilent Technologies, Inc., Santa Clara, CA (US)

( * ) Notice: Subject to any disclaimer, the term of this patent is extended or adjusted under 35 U.S.C. 154(b) by 634 days.

(21) Appl. No.: 17/051,701

(22) PCT Filed: Apr. 30, 2019

(86) PCT No.: PCT/US2019/029903
§ 371 (c)(1),
(2) Date: Oct. 29, 2020

(87) PCT Pub. No.: WO2019/213072
PCT Pub. Date: Nov. 7, 2019

(65) Prior Publication Data
US 2021/0223216 A1 Jul. 22, 2021

(30) Foreign Application Priority Data
Apr. 30, 2018 (DE) .................. 10 2018 110 400.6

(51) Int. Cl.
*G01N 30/32* (2006.01)
*G01N 30/46* (2006.01)

(52) U.S. Cl.
CPC .......... *G01N 30/32* (2013.01); *G01N 30/463* (2013.01); *G01N 30/466* (2013.01); *G01N 30/468* (2013.01)

(58) Field of Classification Search
CPC ......... B01D 15/1878; G01N 30/32–2030/328; G01N 30/461–468
See application file for complete search history.

(56) References Cited

U.S. PATENT DOCUMENTS

| 5,281,256 A | * | 1/1994 | Sacks | G01N 1/26 |
| | | | | 96/104 |
| 2004/0173509 A1 | * | 9/2004 | Ito | G01N 30/463 |
| | | | | 210/94 |

(Continued)

FOREIGN PATENT DOCUMENTS

| DE | 4420047 C1 * 11/1995 ........... G01N 30/462 |
| JP | 5332413 B1   9/2008 |

(Continued)

OTHER PUBLICATIONS

Talus et al, Effect of pressure pulses at the interface valve on the stability of second dimension columns in online comprehensive two-dimensional liquid chromatography, Journal of Chromatography A, 1378 (2015) 50-57 (Year: 2015).*

(Continued)

*Primary Examiner* — David L Singer

(57) ABSTRACT

A multidimensional sample separation apparatus includes a first separation dimension for separating a fluidic sample, a second separation dimension for further separating the fluidic sample, a switching mechanism, and a control unit. The first separation dimension includes a first fluid drive unit and a first sample separation unit. The second separation dimension includes a second fluid drive unit for driving the separated fluidic sample, and second and third sample separation units each configured for further separating the separated fluidic sample. The switching mechanism is configured for selectively switching an outlet of the first separation dimension in fluid communication with a selected one of the second sample separation unit and/or the third sample sepa- (Continued)

ration unit. The control unit is configured for controlling a pressure at inlets of the second sample separation unit and the third sample separation unit to be substantially the same at least at the time of the switching.

20 Claims, 5 Drawing Sheets

(56) References Cited

U.S. PATENT DOCUMENTS

| | | | |
|---|---|---|---|
| 2006/0156792 A1 | 7/2006 | Wang | |
| 2007/0295062 A1* | 12/2007 | Wang | G01N 30/80 73/61.55 |
| 2009/0145851 A1* | 6/2009 | Witt | G01N 30/32 210/741 |
| 2010/0154511 A1 | 6/2010 | Lambertus et al. | |
| 2011/0247403 A1 | 10/2011 | Liu | |
| 2013/0304393 A1* | 11/2013 | Sutan | G01N 30/8665 702/22 |
| 2014/0251911 A1* | 9/2014 | Skudas | B01D 15/3804 210/656 |
| 2015/0122655 A1 | 5/2015 | Choikhet et al. | |
| 2015/0226711 A1* | 8/2015 | Sims | B01D 15/08 73/61.56 |
| 2016/0131619 A1* | 5/2016 | Sims | G01N 30/32 73/61.56 |
| 2016/0238573 A1* | 8/2016 | Venkatramani | G01N 30/463 |
| 2017/0209811 A1* | 7/2017 | Dlugasch | B01D 15/1878 |

FOREIGN PATENT DOCUMENTS

| | | | | |
|---|---|---|---|---|
| KR | 20080059217 A | * | 6/2008 | ........ G01N 30/465 |
| WO | 2016066569 A1 | | 5/2016 | |

OTHER PUBLICATIONS

Waters Corporation, Care and Use Manual Acquity UPLC M-Class Columns, 2014 (Year: 2014).*

Schulenberg-Schell et al, Principles and Practical Aspects of Preparative Liquid Chromatography Primer, Agilent Technologies, 2015 (Year: 2015).*

International Search Report and Written Opinion dated Aug. 14, 2019; Application No. PCT/US2019/029903; 12 pages.

Talus, Eric S., et al; Effect of Pressure Pulses at the Interface Valve on the Stability of Second Dimension Columns in Online Comprehensive Two-Dimensional Liquid Chromatography; Journal of Chromatography A, vol. 1378; 2015; pp. 50-57.

* cited by examiner

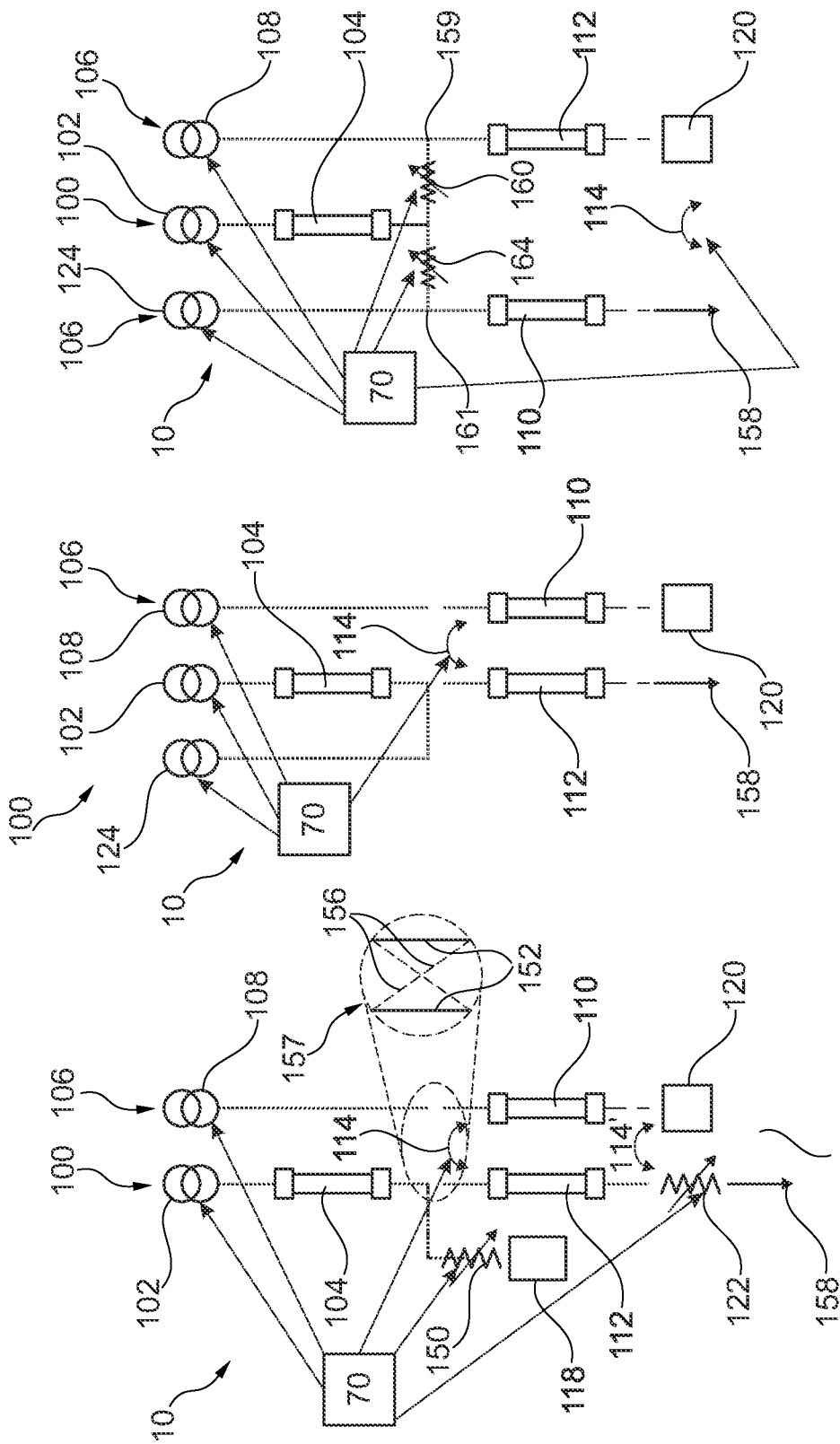

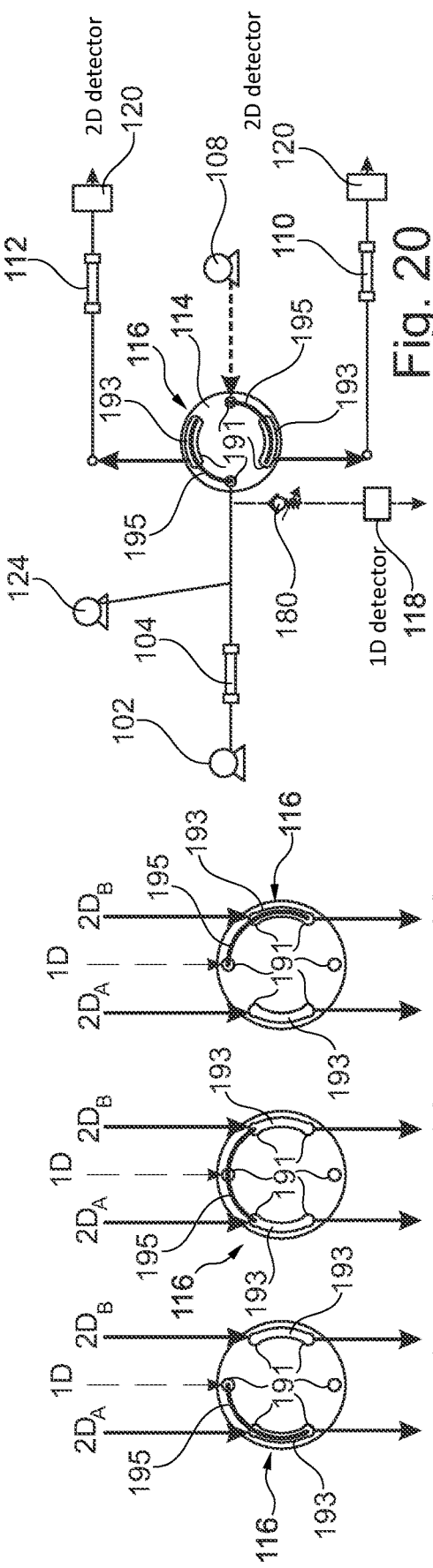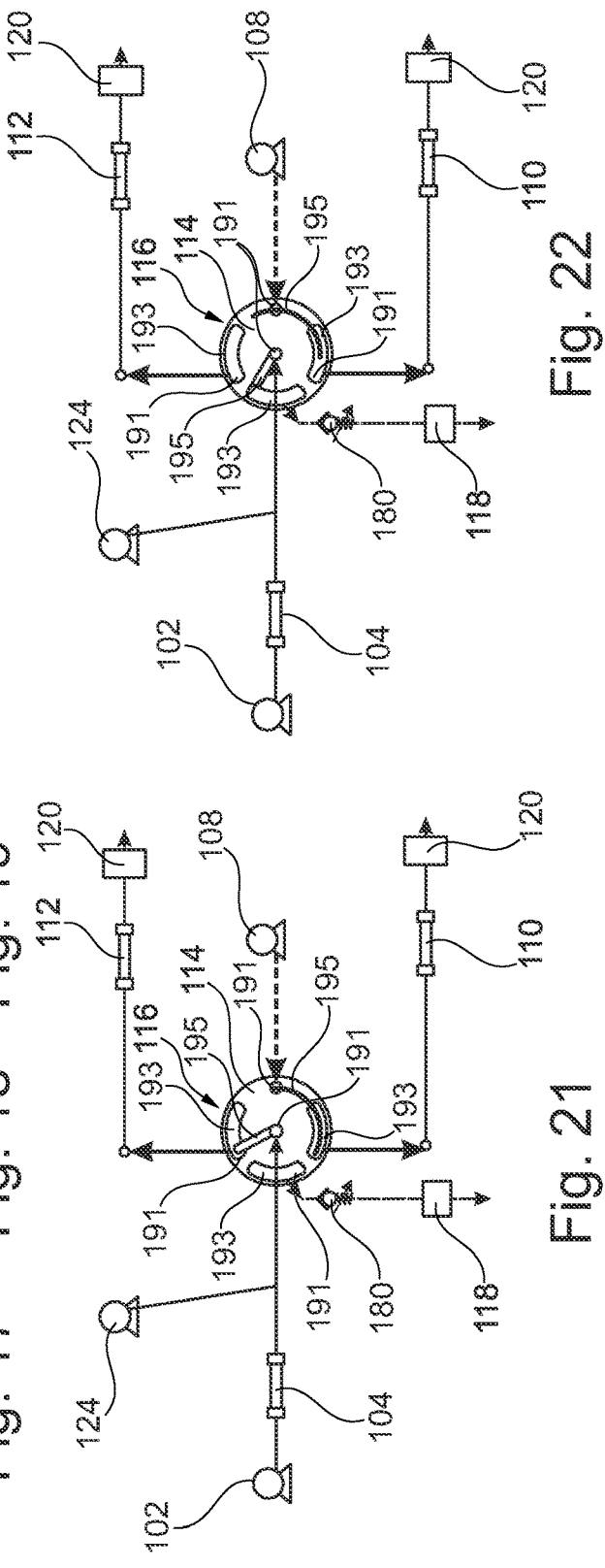

MULTIDIMENSIONAL SAMPLE SEPARATION WITH PRESSURE ADJUSTMENT

RELATED APPLICATIONS

This application is the national stage under 35 U.S.C. 371 of International Application No. PCT/US2019/029903, filed Apr. 30, 2019; which claims priority to German Patent Application No. DE 10 2018 110 400.6, filed Apr. 30, 2018; the entire contents of each of which are incorporated by reference herein.

BACKGROUND ART

The present invention relates to a multidimensional sample separation apparatus, and a method of operating a multidimensional sample separation apparatus.

In liquid chromatography, a fluidic sample and an eluent (liquid mobile phase) may be pumped through conduits and a column in which separation of sample components takes place. The column may comprise a material which is capable of separating different components of the fluidic sample. Such a packing material, so-called stationary phase which may comprise silica gel, may be filled into a column tube which may be connected to other elements (like a sampler, a detector) by conduits.

Two-dimensional separation of a fluidic sample denotes a separation technique in which a first separation procedure in a first separation unit is performed to separate a fluidic sample into a plurality of fractions, and in which a subsequent second separation procedure in a second separation unit is performed to further separate at least one of the plurality of fractions into sub-fractions. Two-dimensional liquid chromatography (2D-LC) may combine two liquid chromatography separation techniques and its output or result may be presented as a plot of time dependency of detection events along two orthogonal time axes.

Two-dimensional liquid chromatography apparatuses are powerful, but often require a more elaborate control.

SUMMARY

It is an object of the invention to provide an efficiently operable multidimensional sample separation apparatus.

According to an exemplary embodiment of the present invention, a multidimensional sample separation apparatus for separating a fluidic sample is provided, wherein the sample separation apparatus comprises a first separation dimension for separating the fluidic sample and comprising a first fluid drive unit (such as a first high pressure pump, for instance embodied as piston pump, in particular capable of driving fluid with a pressure of at least 1000 bar) for driving the fluidic sample and a first mobile phase through a first sample separation unit (such as a first chromatographic column) for separating the fluidic sample, a second separation dimension for further separating the fluidic sample separated by the first separation dimension, wherein the second separation dimension comprises a second fluid drive unit (such as a second high pressure pump, for instance embodied as piston pump, in particular capable of driving fluid with a pressure of at least 1000 bar) for driving the separated fluidic sample and a second mobile phase (which may be the same as the first mobile phase or may be different from the first mobile phase) through a second sample separation unit (such as a second chromatographic column) and a third sample separation unit (such as a third chromatographic column) each configured for further separating the separated fluidic sample, a switching mechanism configured for selectively switching an outlet of the first separation dimension in fluid communication with at least the one selected (in particular with exactly one selected) one of the second sample separation unit and the third sample separation unit, and a control unit configured for controlling a pressure (or pressure value) at inlets of the second sample separation unit and the third sample separation unit to be substantially the same at least at the time of the switching.

According to another exemplary embodiment, a method of operating a multidimensional sample separation apparatus for separating a fluidic sample is provided, wherein the method comprises separating the fluidic sample by a first separation dimension comprising a first fluid drive unit for driving the fluidic sample and a first sample separation unit for separating the fluidic sample, then, after separating the fluidic sample by the first separation dimension, supplying the separated fluidic sample to a second separation dimension for further separating the fluidic sample, wherein the second separation dimension comprises a second fluid drive unit for driving the separated fluidic sample and comprises a second sample separation unit and a third sample separation unit each of which being configured for further separating the separated fluidic sample, and for further separating the fluidic sample by the second separation dimension, switching an outlet of the first separation dimension in fluid communication with at least one selected one (in particular with exactly one selected) of the second sample separation unit and the third sample separation unit so that an inlet pressure (or pressure value) of the second sample separation unit and of the third sample separation unit is substantially the same at least at the point of time of switching.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance small mass molecules or large mass biomolecules such as proteins. Since separation of a fluidic sample into fractions involves a certain separation criterion (such as mass, volume, chemical properties, etc.) according to which a separation is carried out in a first separation dimension, each separated fraction may be further separated in a second separation dimension by another separation criterion (such as mass, volume, chemical properties, etc.) or finer separated by the first separation criterion (under improved conditions), thereby further separating different molecules or particles of a fraction.

In the context of this application, the term "sample separation apparatus" may particularly denote any apparatus which is capable of separating different fractions of a fluidic sample by applying a certain separation technique. Particularly, two separation units may be provided in such a sample separation apparatus when being configured for a two-dimensional separation. This means that the sample is first separated in accordance with a first separation criterion, and at least one or some of the fractions resulting from the first separation are subsequently separated in accordance with a second, preferably different, separation criterion or more finely separated in accordance with the first separation criterion. The term "sample separation unit" may particularly denote a fluidic member through which a fluidic sample is transported and which is configured so that, upon conducting the fluidic sample through the separation unit, the fluidic sample will be separated into different groups of molecules or particles. An example for a sample separation unit is a liquid chromatography column which is capable of trapping or retarding and selectively releasing different fractions of the fluidic sample.

According to an exemplary embodiment of the invention, a multidimensional sample separation apparatus is provided in which undesired pressure shocks or pressure drops may be prevented during transferring fluidic sample which has already been separated in the first separation dimension into the second separation dimension. While conventionally, the mentioned transfer process can be accompanied in an undesired way by a pressure shock or at least pressure fluctuations resulting from different pressure conditions in the first separation dimension and the second separation dimension, a switching mechanism of the multidimensional sample separation apparatus according to an exemplary embodiment of the invention ensures that, at least at the point of time of switching, the inlets of both sample separation units in the second separation dimension are substantially at the same pressure level so that switching an outlet of the first separation dimension alternatingly with any of the two separation units of the second sample separation dimension can be carried out without such a sudden pressure change. Advantageously, the fluidic components of the multidimensional sample separation apparatus are thereby reliably protected from excessive wear or even damage due to the switching operation. Moreover, many artefacts on the separation process can be excluded when the pressure of the two (or more) sample separation units of the second separation dimension are held at essentially the same pressure value when alternatingly switching the fractions of already separated fluidic sample at the end of the first separation dimension into any of the separation units of the second separation dimension. In such a case the pressure at the outlet of the first separation dimension may be essentially the same as at the inlet of at least one of the second dimension sample separation units. It may be thus advantageous to synchronize both or multiple sample separation units in the second separation dimension to a similar pressure value (more specifically to adjust the pressure values at the inlets of the said sample separation units to a similar value), such that switching the outlet of the first separation dimension between the inlets of sample separations units in the second sample separation dimension does not lead to any significant pressure changes.

In the following, further embodiments of the multidimensional sample separation apparatus and the method will be explained.

In an embodiment, the sample separation apparatus is configured as two-dimensional sample separation apparatus or in other words an apparatus for two-dimensional sample separation, in particular two-dimensional liquid chromatography sample separation apparatus or in other words an apparatus for two-dimensional liquid chromatography sample separation. The term "two-dimensional sample separation apparatus" may denote that the corresponding sample separation apparatus has exactly two separation dimensions, i.e. the first separation dimension and the second separation dimension. Pressure drops, pressure fluctuations and other pressure and flow-related artefacts may be efficiently avoided in such a two-dimensional sample separation apparatus by synchronizing the inlet pressure at the inlets of the two alternative sample separation units of the second separation dimension.

In an embodiment, the control unit is configured for controlling operation of at least one of the fluid drive units and/or of the switching mechanism (which may be denoted as fluidic components). For example, the mentioned control unit may be a single processor, a plurality of processors or part of a processor. It is possible that the control unit is a central control unit centrally controlling all instrument components or is composed of multiple (for instance spatially and/or functionally) distributed and/or cooperating control subunits each of which being configured for controlling a respective one or a respective group of the mentioned instrument components and/or other parts, for instance fluidic components of the sample separation apparatus.

In the following five paragraphs, advantageous tasks of the sample separation apparatus and the method will be described which can be controlled or influenced by the above described control unit and/or in another way, for instance manually or on the basis of commands issued by a user and/or of another machine.

In an embodiment, a difference between the pressures (or pressure values) at the inlets of the second sample separation unit and of the third sample separation unit at least at the time of the switching is less than 10%. When the relative difference between the pressure values at the inlets of the multiple sample separation units of the second separation dimension is below 10%, the resulting slight pressure disturbances as a consequence of the switching operation may in many cases be small enough to cause only a slight and thus tolerable performance artefact in the multidimensional sample separation apparatus, also they might have only little or no potential to harm or even damage the components of the multidimensional sample separation apparatus.

In an embodiment, a difference between the pressures (or pressure values) at the inlets of the second sample separation unit and of the third sample separation unit at least at the time of the switching is less than 100 bar. For example, the absolute pressure value of the inlets of the sample separation units of the second separation dimension may be at least 500 bar, in particular at least 1000 bar, more particularly at least 1500 bar. An absolute pressure difference of for instance 100 bar can therefore be acceptable at the inlets of the sample separation units of the second separation dimension.

In an embodiment, the pressure at the inlet of the second sample separation unit and at the inlet of the third sample separation unit at least at the time of the switching is at least 1000 bar, in particular at least 1800 bar. Thus, the multidimensional sample separation apparatus may be capable of fulfilling the requirements of modern high-performance liquid chromatography (HPLC) and ultra high-performance liquid chromatography (UHPLC) applications.

In an embodiment, the pressure (or pressure value) at the inlet of the second sample separation unit and the pressure (or pressure value) at the inlet of the third sample separation unit are substantially the same during an entire operation of the sample separation apparatus. According to such an embodiment, the pressure synchronization between the inlets of the sample separation units of the second separation dimension may be ensured not only around the point of time of switching of the switching mechanism for alternatively coupling the outlet of the first separation dimension to an inlet of any of the sample separation units of the second separation dimension, but the operation of the multidimensional sample separation apparatus may be coordinated accordingly during the whole operation of the sample separation apparatus. This further increases the lifetime of the fluidic components of the sample separation apparatus.

In an embodiment, the pressure (or pressure value) at the inlet of the second sample separation unit and the pressure (or pressure value) at the inlet of the third sample separation unit are substantially at a predefined (for instance adjustable or constant) pressure value at least at the time of switching, in particular continuously. According to such an embodiment, it is not only ensured that the pressure values at the inlets of the sample separation units of the second separation dimension are substantially the same, but they can even be kept at a defined or definable and preferably constant value. This keeps the mechanical stress small, which acts on the fluidic components of the sample separation apparatus during operation thereof. For instance, the predefined pressure value may be at least 1000 bar. The predefined pressure value may be defined by the operation of the fluid drive units, in particular of the one or more fluid drive units of the second separation dimension.

In an embodiment, the switching mechanism is configured for alternatingly coupling the outlet of the first separation dimension to one of the second sample separation unit and the third sample separation unit, respectively. By such an alternating switching logic, the outlet of the first separation dimension may be coupled firstly to one of the sample separation units of the second separation dimension, then to the other one, may be subsequently switched back to the first one, back to the second one, and so on. By taking this measure, it is possible that a very efficient operation of the multidimensional sample separation apparatus is achieved, since at each point of time one of the sample separation units of the second separation dimension may be active in terms of further sample separation of the already pre-separated fluidic sample coming from the first separation dimension.

In an embodiment, the switching mechanism comprises at least one fluidic valve being switchable under control of a control unit. Such a fluidic valve may for instance be a fluidic rotary valve. Such a rotary valve may comprise a rotor component and a stator component. The rotor component and the stator component may be rotatable relative to one another. For example, the stator component may comprise a plurality of fluidic ports to be connected to the various fluidic components of the sample separation apparatus, in particular the fluid drive units and the sample separation units. The rotor component may for instance comprise at least one, preferably a plurality of, fluidic conduits which may be brought in fluid communication or out of fluid communication with respective one of the ports of the stator component, depending on the switching state of the fluidic valve. By such one or more fluidic valves, the described switching operation for coupling the outlet of the first separation dimension to one of the inlets of the sample separation units of the second separation dimension may be realized. The control unit may for instance be a processor or the like and may be configured for controlling overall operation of the sample separation apparatus. In particular, the control unit may coordinate the fluid driving function of the various fluid drive units and may act on the fluidic valve for carrying out the described switching operation.

Additionally or alternatively, the switching mechanism comprises at least one fluidic restriction (preferably a pair of fluidic restrictions) being adjustable under control of a control unit. In particular, the control unit may adjust the value of a respective adjustable fluidic restriction in each of two flow channels at a fluidic splitting element (such as a fluidic T-piece) at an interface of the first separation dimension and the second separation dimension. The actual values of the fluidic restrictions define whether the fluidic sample separated by the first separation dimension flows towards the second and/or the third sample separation unit (see for instance FIG. 3).

In one embodiment, the at least one fluidic restriction comprises one fluidic restriction switchable with the one end alternatively to the outlet of the second sample separation unit or of the third sample separation unit, whereas the second end of the said restriction may be connected to a waste line. In another embodiment, the at least one fluidic restriction comprises two adjustable fluidic restrictions, for instance one affecting the second sample separation unit and another one affecting the third sample separation unit.

In an embodiment, the sample separation apparatus comprises a first dimension detector coupled to an outlet of the first sample separation unit. By such a first dimension detector, fractions of the fluidic sample being separated in the first separation dimension may be analysed or monitored. Such a detector may comprise a flow cell. For example, such a detector may be a light absorption measurement detector (such as a photometric detector) or a fluorescence detector measuring the separated fractions of the fluidic sample downstream of the first sample separation unit optically. The separation can be carried out in accordance with chromatography, in particular liquid chromatography, accomplished by a stationary phase of the first sample separation unit.

In an embodiment, the sample separation apparatus comprises a second dimension detector arranged downstream of the second sample separation unit and being configured for detecting the further separated fluidic sample. Additionally or alternatively to the provision of a first dimension detector of the first separation dimension configured for detecting the fractions of the fluidic sample being separated by the first sample separation unit, it is possible that at least one second dimension detector is provided downstream of a respective one of the second sample separation unit and the third sample separation unit for detecting the further separated fractions of the fluidic sample. These further separated fractions may be sub-fractions of the fractions separated by the first separation dimension which are further separated by the separation function of the respective second or third sample separation unit. The mentioned second dimension detector may be an optical detector, in particular a light absorption detector (such as a photometric detector) or a fluorescence detector detecting the separated sub-fractions of the fluidic sample flowing through a flow cell of the second dimension detector. The detection can be carried out due to specific optical properties of the sub-fractions.

In an embodiment, the sample separation apparatus comprises a fluidic restriction downstream of the third sample separation unit for at least partially equilibrating a pressure at the second sample separation unit and a pressure at the third sample separation unit. Such a fluidic restriction may be an intentionally and locally narrowed portion of a fluidic conduit, or any other intentional disturbance of the flow downstream of the third sample separation unit. Due to the provision and corresponding design of such a fluidic restriction, the pressure synchronization or adaptation at the inlets of the sample separation units of the second separation dimension may be accomplished in a simple and precise way. When the respective fluid drive unit pumps against the second sample separation unit having a detector downstream thereof and/or pumps against the third sample separation unit having a fluidic restriction (preferably downstream thereof), a corresponding design of the fluidic restriction may allow obtaining or adjusting the desired pressure conditions.

In an embodiment, the second fluid drive unit is configured for providing a flow rate being larger than, preferably being at least the double of, more preferably being at least five times of, a lower flow rate provided by the first fluid drive unit. For instance, the first fluid drive unit may deliver fluid (in particular a mobile phase, which may be a solvent composition, and in which the fluidic sample may be accommodated) at a flow rate in a range between 50 µl/min and 500 µl/min, whereas the second fluid drive unit may deliver fluid (in particular a further mobile phase, which may be a further solvent composition, and in which the fluidic sample may be accommodated) with a flow rate in a range between 1 ml/min and 10 ml/min. Pressure adjustment may also be carried out under consideration of the fact that the flow rates of the first separation dimension and the second separation dimension may be very different from one another.

In an embodiment, the sample separation apparatus comprises a third fluid drive unit (such as a third high pressure pump, for instance embodied as piston pump, in particular capable of driving fluid with a pressure of at least 1000 bar) fluidically connected between an outlet of the first sample separation unit and an inlet of at least one of the second sample separation unit and the third sample separation unit (see for instance FIG. 2). The third fluid drive unit may also be fluidically connected between an outlet of the first sample separation unit and the switching mechanism, in particular a fluidic valve thereof. It is thus possible that the second separation dimension has at least one further fluid drive unit which can deliver fluid additionally or alternatively to the so-called second fluid drive unit, i.e. the pump of the second separation dimension. This can further extend the functionality of the second separation dimension. For instance, the third fluid drive unit may be operated as a further pump (for instance a dilution pump for dilution tasks and/or as an additional pump of the second separation dimension having the corresponding functionality as the so-called second fluid drive unit, and thereby providing for a backup of the so-called second fluid drive unit).

In an embodiment, the third fluid drive unit is configured for diluting the separated fluidic sample prior to the further separation. In the described embodiment, the third fluid drive unit can be provided for delivering a diluent to the mobile phase carrying the pre-separated fluidic sample coming from the first separation dimension and being in the process of being transferred towards any of or being further separated by any of the second and the third sample separation units. In particular, a diluent which may be added to pre-separated fluidic sample in a mobile phase may comprise or consist of a solvent being weaker than a solvent in which the pre-separated fluidic sample is present. Diluting the pre-separated fluidic sample before the further separation with a weaker diluent (i.e. a diluent having a lower elution force than the mobile phase in which the pre-separated fluidic sample is presently accommodated (as eluted from the first separation unit)) may support focusing the pre-separated fluidic sample in the head part of the second or third sample separation unit. This focusing effect is highly advantageous for obtaining a precise separation result, since this efficiently prevents that peaks related to different fractions or sub-fractions of the fluidic sample smear out in the second separation dimension and are difficult to distinguish in a chromatogram.

Additionally or alternatively to the function of the third fluid drive unit as a diluent pump, it is also possible that the third fluid drive unit serves as a further fully functional second dimension high pressure pump which can operate in the same way as the second fluid drive unit. For instance, the third fluid drive unit may then be operable as gradient pump capable of providing a time-dependent variation of the relative amounts of two or more solvents of which a mobile phase driven by the third fluid drive unit is composed.

In an embodiment, a sum of a flow rate of the first fluid drive unit and a flow rate of the third fluid drive unit is substantially the same (in particular identical within a range of ±10%) as a flow rate of the second fluid drive unit. In order to achieve this, it is for example possible that the sample separation apparatus is controlled correspondingly by the control unit. In particular when the third fluid drive unit is used as a diluent pump adding a certain additional flow to the pre-separated fluidic sample in a mobile phase, flow adjustment between the fluids transported by the three fluid drive units is advantageous. When the sum of the flow rates of the first and third fluid drive units essentially equals to the flow rate of the second fluid drive unit, any inconsistencies of the flow during transferring fluid from the first separation dimension to the second separation dimension may be advantageously prevented.

In an embodiment, the first fluid drive unit, the second fluid drive unit and the third fluid drive unit are fluidically interconnectable or interconnected via the switching mechanism. In particular, each of the three fluid drive units may be connected to a respective port of a fluidic valve which may constitute the switching mechanism or may form part thereof. Thus, the fluidic path between the switching mechanism and the respective fluid drive units may be kept short, which avoids artefacts and keeps dead volumes small.

In an embodiment, the primary and/or the secondary stage sample separation device is configured as a chromatography sample separation apparatus (in particular a liquid chromatography sample separation apparatus, a gas chromatography sample separation apparatus or a supercritical fluid chromatography sample separation apparatus) or an electrophoretic sample separation apparatus (in particular a capillary electrophoresis sample separation apparatus). However, alternative separating technologies may be applied as well. When the secondary stage sample separation device is configured for liquid chromatography, it can be combined with a primary stage liquid chromatography device to a two-dimensional liquid chromatography apparatus (2D-LC). However, also other combinations of the sample separation techniques are possible, for instance involving electrophoretic sample separation. Advantageously, the primary stage separation and the secondary stage separation are at least partially orthogonal in terms of their respective separation mechanism, i.e. separate the fluidic sample or a fraction thereof in accordance with a different separation criterion or based on a different extent of the same criterion.

In an embodiment, any of the primary and secondary stage sample separation devices may comprise a detector for detecting components of the separated fluidic sample. Such a detector for detecting the individual fractions and sub-fractions may be arranged downstream of the respective separating unit. Such a detector may operate on the basis of an electromagnetic radiation detection principle. For example, an electromagnetic radiation source may be provided which irradiates the sample passing through a flow cell with primary electromagnetic radiation (such as optical light or ultraviolet light). In response to this irradiation with primary electromagnetic radiation, there will be an interaction of this electromagnetic radiation with the fluidic sample so that this interaction can be detected based on variations in properties of the primary radiation (such as intensity, frequency, spectral distribution, propagation direction, vector of polarization or alike) or based on eventually emerging resulting secondary electromagnetic radiation, the said interaction being indicative of the concentration and/or kind of sample components contained in the fluidic fractions.

In an embodiment, the first sample separation device may comprise a sample injector for introduction of the fluidic sample into the separation system upstream of the respective separation unit. In such a sample injector of the primary stage, an injection needle may intake a metered amount of fluidic sample into a connected loop. After driving and inserting such an injection needle in a corresponding seat and upon switching a fluid injection valve, the fluidic sample may be injected into the path between a first fluid drive and the first sample separating unit. Upon such a switching operation, a mobile phase transported by the first fluid drive and constituted by a solvent composition transports the sample to the first sample separation unit and may get partially mixed with the fluidic sample. The secondary stage sample separation device may or may not be free of a sample injector.

In an embodiment, the primary stage separation unit and the secondary stage separation unit are configured so as to execute the respective sample separation in accordance with different separation criteria, particularly in accordance with at least different or partially orthogonal separation criteria. In this context, the term "orthogonal" may particularly denote the low degree or even lack of correlation between the retention parameters in the first and the second dimension in general or at least for the expected sample components.

In one embodiment, the entire fluidic sample supplied from the primary stage is further separated in the secondary stage. In another embodiment, only a part of the fluidic sample supplied from the primary stage is further separated in the secondary stage. Hence, the secondary stage may be operated in a comprehensive mode or in a heart-cut mode or a combination thereof, like piecewise comprehensive.

The sample separation unit of any of the stages may be filled with a separating material. Such a separating material which may also be denoted as a stationary phase may be any material which allows a different degree of interaction with sample components so as to be capable of separating different components of such a sample. The separating material may be a liquid chromatography column filling material or packing material comprising at least one of the group consisting of polystyrene, zeolite, polyvinylalcohol, polytetrafluorethylene, glass, polymeric powder, carbon, graphite, alumina, zirconia, silicon dioxide, and silica gel, or any of above with chemically modified (coated, capped etc) surface. However, any packing material can be used which has material properties allowing a sample passing through this material to be separated into different components, for instance due to different degrees of interactions or affinities between the packing material and fractions of the analyte.

At least a part of any of the sample separation units may be fluid chambers filled with a separating material, wherein the separating material may comprise beads having a size in the range of essentially 0.1 µm to essentially 50 µm. Thus, these beads may be small particles which may be filled inside the separation section of the fluidic device. The beads may have pores having a size in the range of essentially 0.005 µm to essentially 0.2 µm. The fluidic sample may enter the pores, wherein an interaction may occur between the fluidic sample and the inner surface of the pores.

The sample separation apparatus may be, in any of its stages, configured to conduct mobile phase through the system by means of a high pressure, particularly of at least 400 bar, more particularly of at least 1000 bar.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

FIG. 1 shows a two-dimensional sample separation apparatus in accordance with an embodiment of the present invention, particularly used in high performance liquid chromatography (HPLC).

FIG. 2 illustrates a two-dimensional sample separation apparatus according to another exemplary embodiment of the invention.

FIG. 3 illustrates a two-dimensional sample separation apparatus according to still another exemplary embodiment of the invention.

FIG. 17 illustrates a fluidic valve forming part of a switching mechanism of a multidimensional sample separation apparatus according to an exemplary embodiment of the invention.

FIG. 18 illustrates a fluidic valve forming part of a switching mechanism of a multidimensional sample separation apparatus according to another exemplary embodiment of the invention.

FIG. 19 illustrates a fluidic valve forming part of a switching mechanism of a multidimensional sample separation apparatus according to another exemplary embodiment of the invention.

FIG. 20 shows a two-dimensional sample separation apparatus with a fluidic valve based switching mechanism according to an exemplary embodiment of the invention.

FIG. 21 shows a two-dimensional sample separation apparatus with a fluidic valve based switching mechanism according to another exemplary embodiment of the invention in a switching state.

FIG. 22 shows a two-dimensional sample separation apparatus with a fluidic valve based switching mechanism according to another exemplary embodiment of the invention in a different switching state as compared to FIG. 21.

Figure 4:
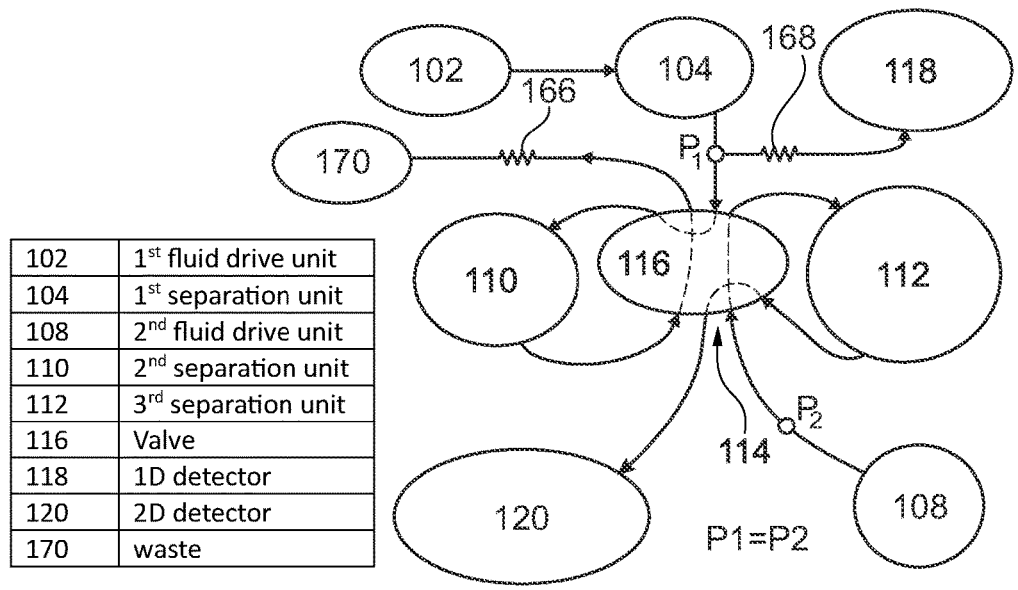
FIG. 4 schematically illustrates cooperation of fluidic components of a two-dimensional sample separation apparatus according to an exemplary embodiment of the invention.

The illustration in the drawing is schematic.

DETAILED DESCRIPTION

Before describing the figures in further detail, some basic considerations of the present invention will be summarized based on which exemplary embodiments have been developed.

According to an exemplary embodiment of the invention, a loopless two-dimensional sample separation apparatus (in particular two-dimensional liquid chromatography apparatus, 2D-LC) is provided which may employ at least two sample separation units (in particular chromatography columns) in the second separation dimension. In an embodiment, the sample separation apparatus may be operated in an operation mode in which solvent is actively modulated during loading a sample or a pre-separated sample onto a sample separation unit and/or is operated in gradient-elution mode.

When modulating or sampling in multi-dimensional liquid chromatography, it is a conventional shortcoming that the sample matrix of eluting peaks of the first separation dimension is a too strong eluent for the second dimension. It is possible to dilute the fractions or peaks of the fluidic sample before it reaches the stationary phase of a separation unit of the second dimension, in particular the column packing of the said separation unit.

In conventional 2D-LC configurations, specifically in a so-called comprehensive mode, it may end out in a situation where the fraction collecting after the first sample separation dimension or loading to the second sample separation dimension has to cover about the same time as it needs to elute the separated peaks in the second sample separation dimension.

In order to overcome shortcomings of conventional multidimensional sample separation apparatuses, along with integrating all switching functionality inside one common interface valve in an exemplary embodiment of the invention, one or more further features can be implemented including: volume based operation mode, especially at controlled pressure level, most beneficially adapting the inlet pressure values of the multiple sample separation units of the second separation dimension to be equal at the time of valve switching.

In an embodiment, a dilution pump may be added in form of a third fluid drive unit of the second separation dimension by implementing a pre-modulator T-junction or the like, which may allow for a selected dilution factor, to enable or even especially optimize for peak stacking on a separation unit in the downstream direction.

In another embodiment, it is also possible to add a gradient pump (as third fluid drive unit) for the flow scheme in the second separation dimension, which may allow for a simple valve scheme.

In an embodiment, each of the fluid drive units of the second separation dimension may be programmed for a complete cycle of sample loading and subsequent gradient elution, whereas during sample loading phase a dilution of the sample may be achieved. More specifically, the sample represented by the effluent of the first dimension may be online-mixed with the solvent provided by the said fluid drive unit at the outlet of the first dimension separation unit, or before entering a second dimension separation unit or at any point in between.

A switching mechanism of a sample separation apparatus according to an exemplary embodiment of the invention may be configured as one or more fluidic valves, which may be switched under control of a control unit (such as a processor), and which can be for example check valves. This enables a flow direction control by controlling pressure and/or flow of the fluid drive units (in particular pumps) without need for further switching elements. The flow out of the sample separation unit of the first separation dimension (in particular a chromatographic column) may take the path with the lower pressure. In order to direct the said flow from the first separation dimension towards a desired one of the multiple sample separation units of the second separation dimension, it may be sufficient to decrease the flow and/or pressure of the respective fluid drive unit of the second separation dimension at the desired side and/or to increase the pressure in the second separation dimension at the opposite side. It may be also possible to control the opening pressure of an overpressure valve (which discards the excessive effluent of the first separation dimension) in accordance with the inlet pressure of the sample separation units of the second separation dimension. The control unit can be electrical or hydro-mechanical, such that the opening pressure of the said overpressure valve may be for instance slightly higher than the operating pressure in the second separation dimension. In this case closure of both (in particular active) valves between the first and the second separation dimension may cause discarding the effluate of the first separation dimension without any significant changes of the operation conditions.

It may be also possible to place a buffer valve downstream of the sample separation unit of the first separation dimension and upstream of the dilution pump (as further fluid drive unit of the second separation dimension). Such a buffer valve may buffer or temporarily accommodate fluid coming from the first separation dimension before being further separated in the second separation dimension.

In one embodiment, a sample separation apparatus may be operated in accordance with an uninterruptedly connected configuration, which may also be denoted as forced full comprehensive.

It is however also possible to implement a configuration with sampling flow management. It is in particular possible to disrupt the sample flow into the second separation dimension and to redirect it to waste via an overpressure valve. Alternatively or additionally, it may be possible to temporarily draw a limited volume of the effluent into the path of the dilution pump during the valve switching and thus accommodate it in the said path or its elements, thus preventing undesired sample loss.

In an embodiment, the overpressure valve can be replaced by a restrictor (in particular a tunable or adjustable restrictor), or a combination of a pressure regulator and restrictor.

According to an exemplary embodiment of the invention, a shortcoming of conventional multidimensional sample separation apparatuses is overcome by preventing pressure fluctuations when transferring a fluidic sample from a first sample separation dimension to a subsequent second sample separation dimension.

Conventionally, such pressure fluctuations may occur when injecting a portion of a pre-separated fluidic sample from the first separation dimension into the second separation dimension due to compressibility of the sample fluid and/or elasticity of the sample accommodation reservoir, in the case the pressure in the sample to be transferred to the flow path of the second dimension differs from the pressure in that flow path. Such pressure fluctuations may also occur due to a temporary interruption of flow during the switching of a fluidic switching element.

In order to overcome such shortcomings, an exemplary embodiment of the invention provides a plurality of sample separation units in the second separation dimension and alternatingly couples or directs a flow of pre-separated fluidic sample coming from the first separation dimension to one of the sample separation units of the second separation dimension at a time. By ensuring that the inlet pressures of the second sample separation unit and the third sample separation unit are substantially the same at least at the point of time of switching the switching mechanism between these sample separation units or of redirecting the pre-separated fluidic sample from between the ones of the sample separation units of the second separation dimension, such pressure fluctuations or other sudden pressure changes can be efficiently prevented. Thereby, artefacts in the separation results are prevented and the fluidic components of the multidimensional sample separation apparatus are efficiently protected from excessive mechanical load, wear and/or ageing, thereby extending the lifetime of these fluidic components.

FIG. 1 shows a two-dimensional sample separation apparatus 10 in accordance with an embodiment of the present invention, particularly used in high performance liquid chromatography (HPLC).

The sample separation apparatus 10 is configured for separating a fluidic (in particular liquid) sample in a mobile phase (such as a solvent composition) by liquid chromatography and comprises a first separation dimension 100 for separating the fluidic sample into fractions. The first separation dimension 100 comprises a first fluid drive unit 102, which is configured as a first piston-type high pressure pump, for driving the fluidic sample to be separated and for driving a mobile phase, which may be a solvent or a solvent composition. The first separation dimension 100 furthermore comprises a first sample separation unit 104, which is here embodied as chromatographic column, for separating the fluidic sample.

Moreover, the sample separation apparatus 10 comprises a second separation dimension 106 fluidically connectable to the first sample separation dimension 100 and being configured for further separating the fluidic sample which has already been separated in the first separation dimension 100. In particular instrument components with reference numerals 108, 110, 112 relate to the second separation dimension 106. In the shown embodiment, the second separation dimension 106 comprises a second fluid drive unit 108 in form of a second piston-type high-pressure pump for driving a mobile phase, which may be a further solvent or solvent composition, together with the separated fluidic sample. In the shown embodiment, the second fluid drive unit 108 may be configured for providing a flow rate being significantly larger than another flow rate provided by the first fluid drive unit 102. The second separation dimension 106 furthermore comprises a second sample separation unit 110 and a third sample separation unit 112, which are embodied as chromatographic columns, and are each configured for further separating the pre-separated fluidic sample into sub-fractions.

The two-dimensional sample separation apparatus 10 furthermore comprises a switching mechanism 114, which is here embodied as a fluidic valve 116 (see the below figures). A control unit 70 (such as a processor) controls the entire operation of the components of the sample separation apparatus 10. In particular, the control unit 70 controls the fluid drive units 102, 108, the switching mechanism 114 and the optional adjustable restrictions 122, 150. Although not shown in each figure for the sake of simplicity, a control unit 70 configured for controlling at least one of at least one of the fluid drive units 102, 108, 124 (see below), the switching mechanism 114, etc. may be provided in each and every embodiment.

The switching mechanism 114 is configured for selectively switching an outlet of the first separation dimension 100 in fluid communication with a selected one of the second sample separation unit 110 and the third sample separation unit 112. In this context, an inlet pressure of the second sample separation unit 110 and the third sample separation unit 112 may be kept or made substantially the same at least at the time of the switching by the switching mechanism 114. The latter pressure adjustment may be carried out, for example, under control of the control unit 70. Advantageously, fluidic restriction 122 may be provided downstream of the third sample separation unit 112 for partially or completely equilibrating between a pressure at the second sample separation unit 110 and a pressure at the third sample separation unit 112. In particular, a difference between the pressures at the inlets of the second sample separation unit 110 and of the third sample separation unit 112 at least at the time of the switching may differ by only less than 10%. Preferably, an absolute difference between the pressures at the inlets of the second sample separation unit 110 and of the third sample separation unit 112 at least at the time of the switching is less than 100 bar. In the described embodiment, the pressure at the inlet of the second sample separation unit 110 and at the inlet of the third sample separation unit 112 at least at the time of the switching is for example 1200 bar. Preferably, the pressure at the inlet of the second sample separation unit 110 and the pressure at the inlet of the third sample separation unit 112 may be substantially the same not only at the point of time of switching, but over an entire operation of the sample separation apparatus 10. It is particularly preferred when the pressure at the inlet of the second sample separation unit 110 and the pressure at the inlet of the third sample separation unit 112 are substantially at a predefined pressure value at least at the time of switching, most preferably continuously during the entire operation of the sample separation apparatus 10. The switching mechanism 114 is configured for alternatingly coupling the outlet of the first separation dimension 100 to the second sample separation unit 110 and the third sample separation unit 112, respectively, so as to direct the pre-separated fluidic sample either to the second sample separation unit 110 or to the third sample separation unit 112.

As can be taken from FIG. 1, the sample separation apparatus 10 furthermore comprises a first dimension detector 118, which may be a flow cell in combination with a fluorescence detector, coupled to an outlet of the first sample separation unit 104 via adjustable fluidic restriction 150. Beyond this, the sample separation apparatus 10 may comprise a second dimension detector 120, which may be a flow cell in combination with a fluorescence detector, arranged downstream of the second sample separation unit 110 and being configured for detecting the further separated fluidic sample.

Advantageously, the restrictor 122 and the detector 120 can be switched simultaneously by switching a valve or the like accomplishing the switching function as illustrated in FIG. 1 with reference numeral 157, as depicted by a portion of the switching mechanism designated 114'.

The sample separation apparatus 10 shown in FIG. 1 provides a flow rate of mobile phase driven by the first fluid drive unit 102 of for example 100 μl/min. In contrast to this, the second fluid drive unit 108 drives a mobile phase with a higher flow rate of for example 2 ml/min. In other words, the second fluid drive unit 108 provides more flow than the first fluid drive unit 102. Referring to the first separation dimension 100, first fluid drive unit 102 delivers a mobile phase in which a fluidic sample is injected. For this purpose, an injector valve or the like may be provided via which a fluidic sample, which may be pre-stored in a sample accommodation volume such as a sample loop, can be injected towards an inlet of the first sample separation unit 104 (not shown). When the first fluid drive unit 102 drives the fluidic sample on the first sample separation unit 104, the various fractions of the fluidic sample are adsorbed by a stationary phase of the first sample separation unit 104 in accordance with the well-known principle of liquid chromatography. When subsequently the first fluid drive unit 102 provides an eluent flow, i.e. a solvent composition of a stronger solvent (for instance an organic solvent such as ethanol) and a weaker solvent (for instance water) with varying composition or an isocratic eluent flow (i.e. an eluent flow with constant composition), the fractions of the fluidic sample which are immobilized or adsorbed on the stationary phase of the first sample separation unit 104 are individually released and can be detected by first dimension detector 118 downstream of the optional auxiliary restriction 150. It is however possible, that the detector cell or detector 118 is stable against high pressure and can be switched in series after the first sample separation unit 104 and before the switching mechanism 114 (which may be configured as switching valve).

It is however also possible, additionally or alternatively, that at least a portion of the pre-separated fluidic sample from the first separation dimension 100 is introduced into the second separation dimension 106 by correspondingly operating the switching mechanism 114. For instance, the switching mechanism 114 can be configured as a fluidic valve 116 (compare FIG. 17 to FIG. 22) under control of control unit 70. For instance, such a fluidic valve based switching mechanism 114 may comprise a cross-switching valve which is capable of switching the fluidic path between a straight configuration (see reference numeral 152) and a cross-configuration (see reference numeral 156) shown in detail 157. The pre-separated fluidic sample coming from an outlet of the first separation dimension 100 can then be coupled either to an inlet of second sample separation unit 110 or an inlet of third sample separation unit 112, depending on the switching state of the switching mechanism 114. A mobile phase provided by the second fluid drive unit 108 may then further separate the pre-separated fluidic sample, for instance by a gradient flow provided by the second fluid drive unit 108. The further separated fluidic sample may then flow to a second dimension detector 120 downstream of the second sample separation unit 110. The restrictor 122 being fluidically coupled to waste 158 may be switched such, that it is at any time connected to that one of the separation units 110,112 which is connected to the first sample separation unit 104 (thus elevating the pressure at the outlet of the first sample separation unit 104). The detector 120, in turn, is connected to the other one of the separation units 110,112, which is at that time connected to the second separation dimension 106, thus detecting the results of the separation in the second dimension. The switching mechanism 114 may therefore switch one of the second sample separation unit 110 and third sample separation unit 112 in or into a loading mode (connected to the first sample separation unit 104) and the other one of the second sample separation unit 110 and third sample separation unit 112 in or into an analysis mode (connected to the second separation dimension 106). By synchronizing or correspondingly adjusting the pressure values at the inlets of the second sample separation unit 110 and of the third sample separation unit 112 at least at and around a point of time of switching by switching mechanism 114, pressure fluctuations when switching over from one of the second sample separation unit 110 and the third sample separation unit 112 to the other one and when transferring the pre-separated fluidic sample from the first separation dimension 100 to the second separation dimension 106 can be efficiently suppressed. The suppression of such pressure jumps increases the lifetime of the fluidic components and prevents artefacts on the separation result.

Since the restrictor 122 can elevate the pressure in the first separation dimension 100 (more precisely at the outlet of the separation unit 104), and adjust it to the same value as in the second separation dimension 106 (at the outlet of the second fluid drive unit 108), no pressure shocks occur when the switching mechanism 114 is switched over.

FIG. 2 illustrates a two-dimensional sample separation apparatus 10 according to another exemplary embodiment of the invention.

According to FIG. 2, a third fluid drive unit 124 is provided, which may be embodied as a high-pressure piston-type pump fluidically connected between an outlet of the first sample separation unit 104 on the one hand and, on the other hand, an inlet of the second sample separation unit 110 or the third sample separation unit 112, depending on the switching state of the switching mechanism 114 (which may be embodied as in FIG. 1). Advantageously, the third fluid drive unit 124 is configured for adding a fluid flow to the separated fluidic sample prior to the further separation (for instance, but not limited to diluting the fluidic sample by the added fluid flow). It is preferred that a sum of a flow rate of the first fluid drive unit 102 and a flow rate of the third fluid drive unit 124 is substantially the same as a flow rate of the second fluid drive unit 108 or that the pressure generated at the inlet of third sample separation unit 112 (or at the inlet of second sample separation unit 110, depending on which one of the two is connected to the first sample separation unit 104) is essentially the same as at the inlet of second sample separation unit 110 (or respectively third sample separation unit 112), connected to the second fluid drive unit 108.

In the embodiment of FIG. 2, the additional third fluid drive unit 124 of the second separation dimension 106 is provided which is here configured as a diluent pump. The third fluid drive unit 124 dilutes the pre-separated fluidic sample coming from the first separation dimension 100 and flowing into the second separation dimension 106. In particular, the third fluid drive unit 124 may add a flow of a weaker solvent to the pre-separated fluidic sample coming from the first separation dimension 100, which diluent is a weaker solvent as compared to the mobile phase in which the fluidic sample coming from the first separation dimension 100 is transported. By taking this measure, trapping and focusing the pre-separated fluidic sample close to the inlet of a respective one of the second sample separation unit 110 and the third sample separation unit 112 (i.e. at a respective pump head) can be accomplished. Thus, the individual peaks in a chromatogram may be made narrow and broadening due to an excessively strong solvent in which the fluidic sample is delivered at the outlet of the first sample separation unit 104 may be avoided.

Descriptively speaking, the auxiliary or dilution flow from the third fluid drive unit 124 as well as the flow transported by the first fluid drive unit 102 of the first separation dimension 100 flow together. Preferably, the sum of these two partial flows is identical to the flow of the second fluid drive unit 108. More preferably, the sum flow generates pressure at the inlet of the respective second or third sample separation unit 110 or 112 essentially equal to the pressure at the inlet of the respectively other one of these sample separation units 110, 112. As a result, the pressure conditions of the two sample separation units 110, 112 of the second separation dimension 106 correspond to one another.

Advantageously, the third fluid drive unit 124 can be a simple pump, for instance can be an isocratic pump which not necessarily has to have a capability of providing a gradient flow. This keeps the two-dimensional sample separation apparatus 10 of FIG. 2 simple in construction.

FIG. 3 illustrates a two-dimensional sample separation apparatus 10 according to still another exemplary embodiment of the invention.

In the embodiment of FIG. 3, the second fluid drive unit 108 and the third fluid drive unit 124 being assigned to the second separation dimension 106 can be two full functional high pressure pumps, for instance two gradient pumps capable of providing a gradient flow. A first—optionally controllable—restriction 160 between an outlet of the first separation dimension 100 on the one hand and an intermediate point 159 between second fluid drive unit 108 and third sample separation unit 112 may be adjustable. Correspondingly, a further adjustable fluidic restriction 164 between an outlet of the first separation dimension 100 and an intermediate point 161 between the third fluid drive unit 124 and the second sample separation unit 110 may be adjustable as well. By adjusting the fluidic restrictions 160, 164 (up to complete flow interruption) and adjusting the flows provided by the fluid drive units 108, 124, the outlet of the first separation dimension 100 may be coupled with a respective one of the second sample separation unit 110 or the third sample separation unit 112 (or to both with an adjustable ratio). Moreover, adjusting the flows provided by the fluid drive units 108, 124 allows redirecting the flow coming out of the first sample separation unit 104 to either of the intermediate points 159, 161 and respectively to the sample separation units 112, 110. In other words, the present value of the respective adjustable restriction 160 and the other adjustable restriction 164 may define as to whether the pre-separated fluidic sample coming from the first separation dimension 100 flows only to the second sample separation unit 110, only to the third sample separation unit 112 or is split between the second sample separation unit 110 and the third sample separation unit 112. For instance, the adjustable restrictions 160, 164 may be realized by active or passive valves, etc. As a rule of thumb, a switching between the two (or more) different sample separation units 110, 112 of the second separation dimension 106 may occur in intervals of 15 s, more generally may be in a range between 3 s and 60 s or even at shorter or longer periods of time.

FIG. 4 schematically illustrates cooperation of fluidic components of a two-dimensional sample separation apparatus 10 according to an exemplary embodiment of the invention.

FIG. 4 is a schematic representation of a coupling scheme between fluidic components of a first separation dimension 100 and a second separation dimension 106, as defined in FIG. 1 to FIG. 3. According to an exemplary embodiment of the invention, the pressure conditions can be adjusted so that the pressure value at position P1 is equal to the pressure value at position P2 at the time of switching fluidic valve 116 of switching mechanism 114 according to FIG. 1, FIG. 2 or so that both pressure values are similar at the time of redirecting the flow out of the first sample separation unit 104 according to FIG. 3. The schematic diagram of FIG. 4 shows a number of fluidic restrictions 166, 168 as well as a waste connection 170. When the mentioned condition P1=P2 is fulfilled, it can be ensured that pressure fluctuations and pressure shocks are avoided when switching the fluidic valve 116 of the switching mechanism 114 for directing the fluidic sample from the first separation dimension 100 to either of the second or third sample separation units 110, 112 in the second separation dimension 106.

Figure 5:
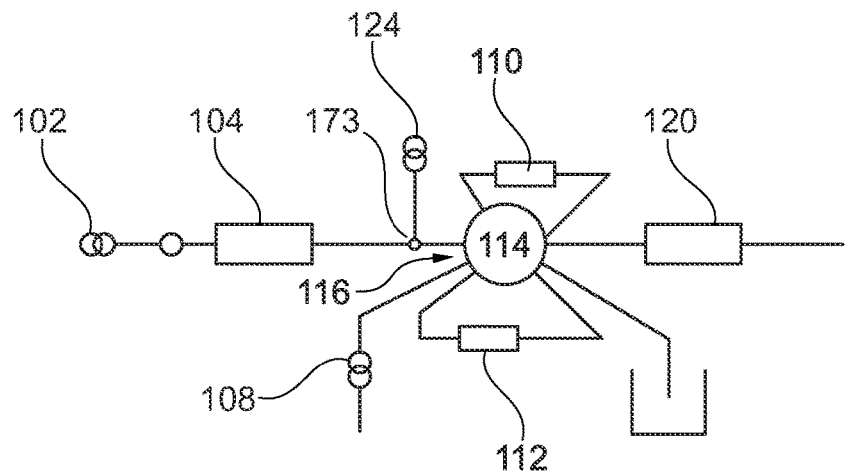
FIG. 5 illustrates a coupling architecture of a two-dimensional sample separation apparatus according to an exemplary embodiment of the invention.

FIG. 5 illustrates a coupling architecture of a two-dimensional sample separation apparatus 10 according to an exemplary embodiment of the invention.

In particular, FIG. 5 shows connections of the various fluidic components of the two-dimensional sample separation apparatus 10 to ports of the fluidic valve 116 forming part of the switching mechanism 114. Third fluid drive unit 124 is configured as dilution pump in the shown embodiment and is connected via a T-junction 173.

Figure 6:
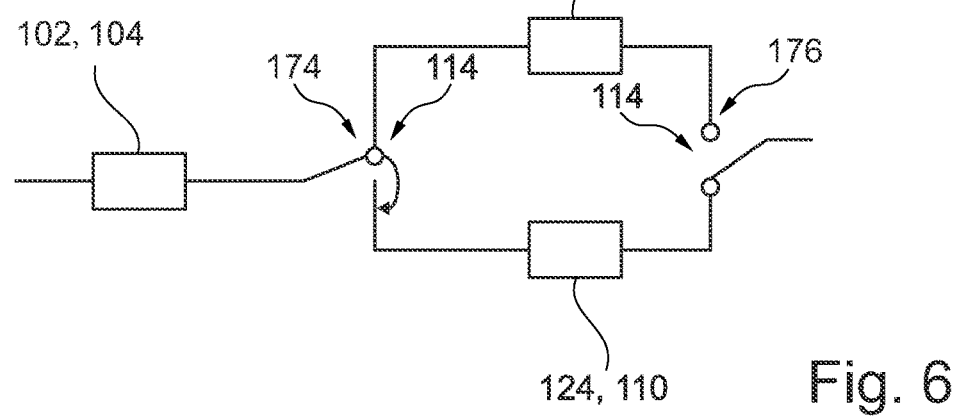
FIG. 6 illustrates a switching operation of a two-dimensional sample separation apparatus according to another exemplary embodiment of the invention.

FIG. 6 illustrates a switching operation of a two-dimensional sample separation apparatus 10 according to another exemplary embodiment of the invention.

The switching at a first switching point 174 and at a second switching point 176 according to FIG. 6 can be accomplished by control unit 70 acting on respective fluidic valves 116 of the switching mechanism 114.

Figure 7:
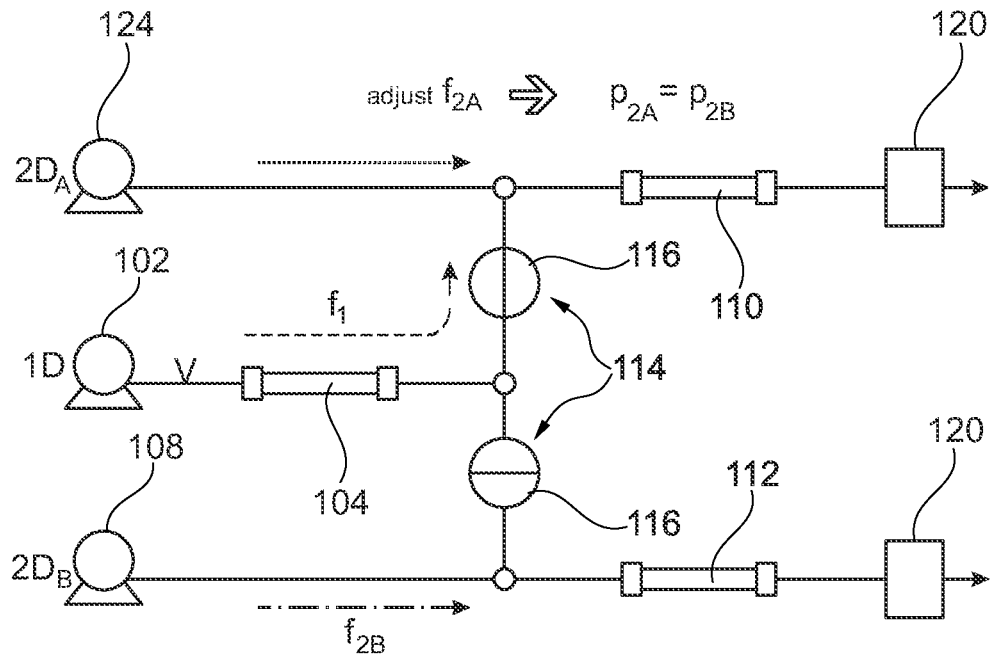
FIG. 7 illustrates a two-dimensional sample separation apparatus according to yet another exemplary embodiment of the invention.

FIG. 7 illustrates a two-dimensional sample separation apparatus 10 according to yet another exemplary embodiment of the invention.

In FIG. 7, the switching mechanism 114 is realized by two fluidic valves 116 (alternatively by an adjustable restriction, see reference numerals 160, 164 in FIG. 3). FIG. 7 shows sample separation apparatus 10 which corresponds to the schematic illustration of FIG. 3. Flow rate $f_1$ relates to the separation in the first separation dimension 100 (see 1D), whereas $f_{2B}$ denotes a flow rate delivered by the second fluid drive unit 108 for the separation in the second separation dimension 106 according to the flow and valve states depicted in the FIG. 7 (see $2D_B$). Accordingly, $f_{2A}$ denotes a flow rate delivered by the third fluid drive unit 124 (see $2D_A$) for the fluid addition (in particular dilution) of the sample fraction flowing out of the first sample separation unit 104 and being transferred (on) to the second sample separation unit 110. When operating the sample separation apparatus 10 according to FIG. 7, sample components transported according to $f_1$ can be trapped onto the second sample separation unit 110 (column of $2D_A$), after a sample fraction flowing out of the first sample separation unit 104 has been diluted by the flow $f_{2A}$. Flow rate $f_{2A}$ can be adjusted so that the pressure values $p_{2A}=p_{2B}$, i.e. the pressure values at the inlets of the sample separation units 110, 112 are the same. Alternatively the flow rate $f_2B$ can be adjusted so that the pressure values $p_{2a}=p_{2B}$. This might be especially advantageous, if the separation in the second separation dimension 106 (in this case in the third sample separation unit 112 driven by the second fluid drive unit 108) is performed in the volume based operation mode.

Figure 8:
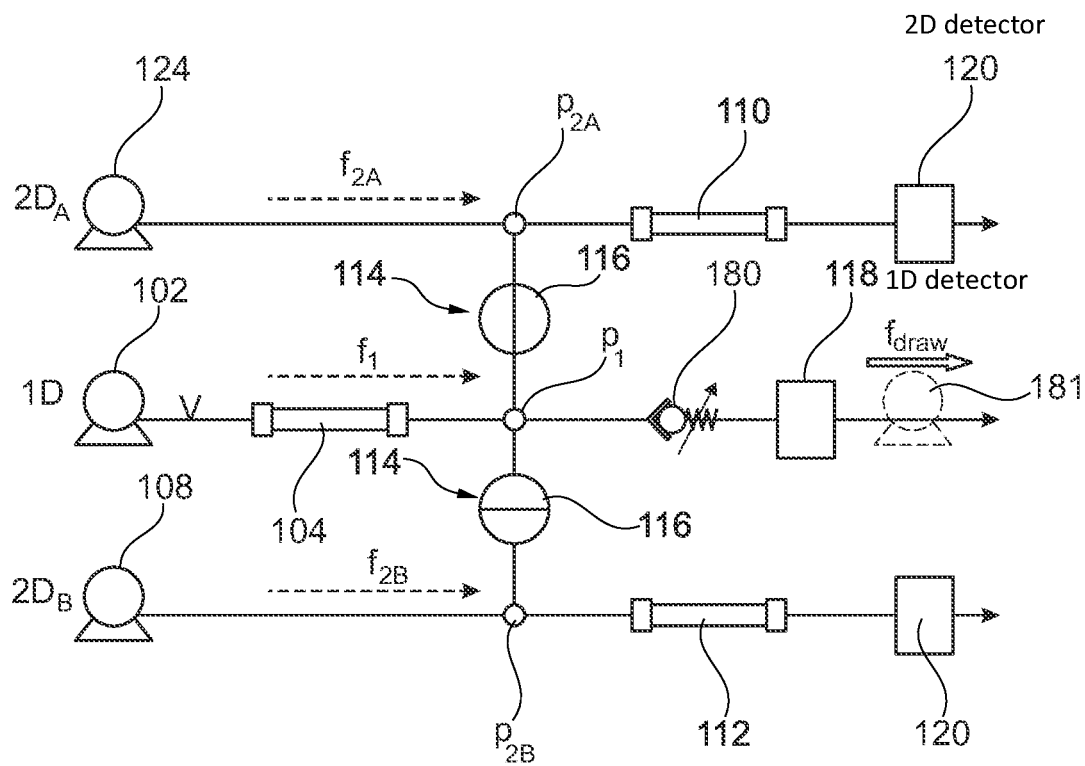
FIG. 8 illustrates a two-dimensional sample separation apparatus according to still another exemplary embodiment of the invention.

FIG. 8 illustrates a two-dimensional sample separation apparatus 10 according to still another exemplary embodiment of the invention.

FIG. 8 shows a sample separation apparatus 10 similar to the architecture of FIG. 3. Also in FIG. 8, the switching mechanism 114 is realized by two fluidic valves 116 (alternatively by an adjustable restriction, see reference numerals 160, 164 in FIG. 3). FIG. 8 also shows an overpressure valve 180 opening above a predefined threshold pressure. An optional draw pump 181 is shown as well in FIG. 8.

However, the draw pump 181 may be implemented also without the pressure regulating overpressure valve 180.

The flow according to $f_{2A}$ according to the flow and valve state depicted in the FIG. 8 may be a diluent. Consequently, future sample separation by second sample separation unit 110 may be accomplished after a proper focusing of the fluidic sample close to the column head of the second sample separation unit 110. In the shown switching operation, the following flow equation may be fulfilled: flow rate ($2D_A$)+ flow rate (1D)=flow rate ($2D_B$). Alternatively the flow rates, i.e. flow rate ($2D_A$) and flow rate ($2D_B$), may be adjusted such that $p_{2A}=p_{2B}$ The second fluid drive units 108, 124 may operate as gradient pump and may alternatingly separate fluidic sample in its assigned flow path, i.e. using third sample separation unit 112.

When both valves 116 are switched (in particular toggled), the roles of the two fluidic paths in the second separation dimension 106 are changed alternatingly (for instance into a different configuration, whereas the flow rates, i.e. flow rate ($2D_B$) and flow rate ($2D_A$), are adjusted to satisfy the following equation: flow rate ($2D_B$)+flow rate (1D)=flow rate ($2D_A$)).

FIG. 9 to FIG. 12 show the operational sequence of the sample separation apparatus 10 of FIG. 7. Correspondingly, FIG. 13 to FIG. 16 show an operational sequence of the sample separation apparatus 10 of FIG. 8. In all these figures, the flow is indicated by arrows.

Figure 9:
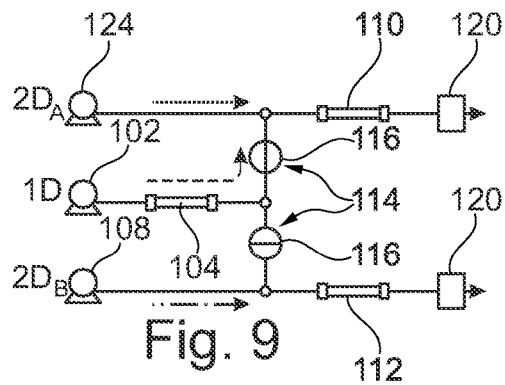
FIG. 9 illustrates the two-dimensional sample separation apparatus of FIG. 7 in an operation state.
Figure 10:
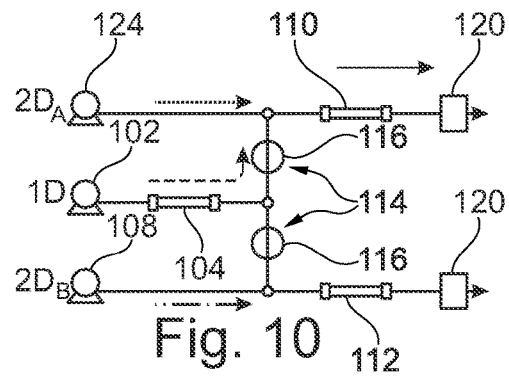
FIG. 10 illustrates the two-dimensional sample separation apparatus of FIG. 7 in a different operation state.
Figure 11:
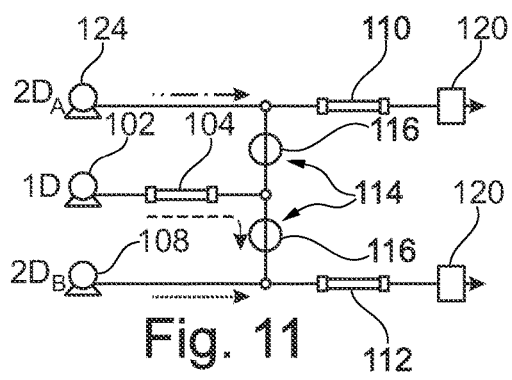
FIG. 11 illustrates the two-dimensional sample separation apparatus of FIG. 7 in another, different operation state.
Figure 12:
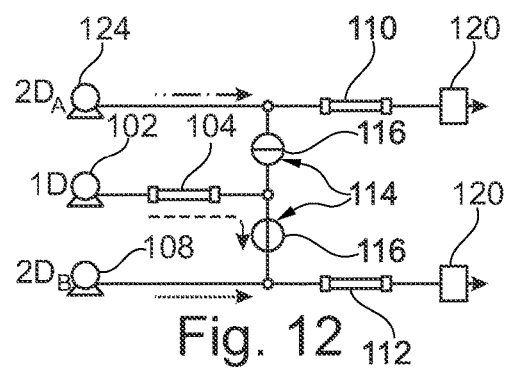
FIG. 12 illustrates the two-dimensional sample separation apparatus of FIG. 7 in yet another, different operation state.
Figure 13:
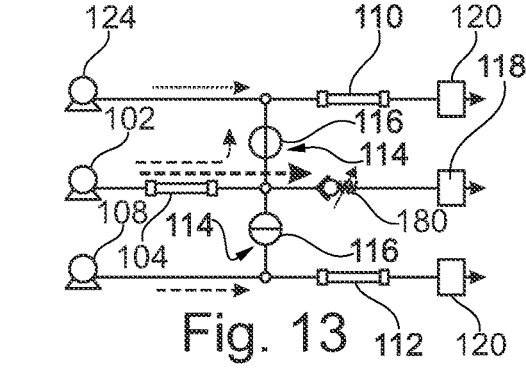
FIG. 13 illustrates the two-dimensional sample separation apparatus of FIG. 8 in an operation state.
Figure 14:
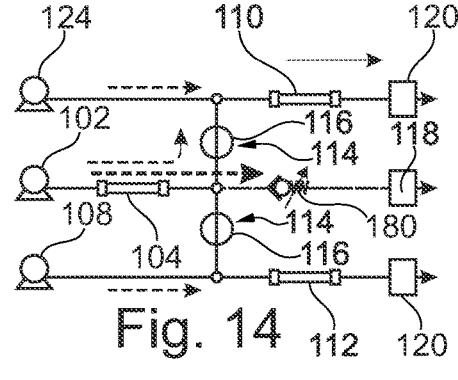
FIG. 14 illustrates the two-dimensional sample separation apparatus of FIG. 8 in a different operation state.
Figure 15:
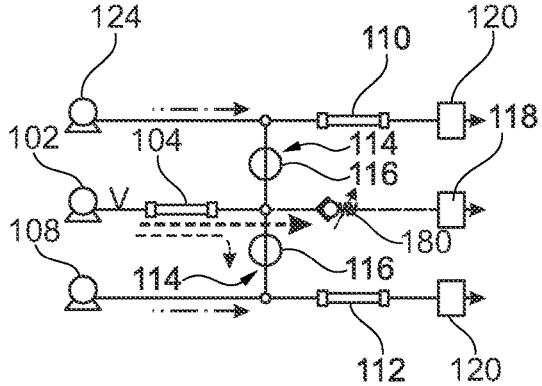
FIG. 15 illustrates the two-dimensional sample separation apparatus of FIG. 8 in another, different operation state.
Figure 16:
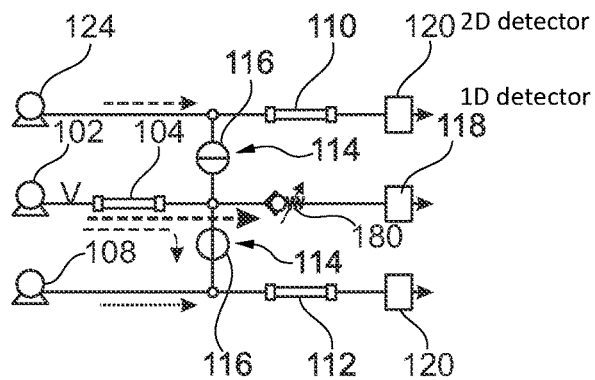
FIG. 16 illustrates the two-dimensional sample separation apparatus of FIG. 8 in yet another, different operation state.

FIG. 9 and FIG. 13 depict the operation of separation in the second dimension on the third sample separation unit 112 and sample loading onto the second sample separation unit 110; FIG. 12 and FIG. 16 depict the operation of separation in the second dimension on the second sample separation unit 110 and sample loading onto the third sample separation unit 112. FIG. 10, FIG. 11, FIG. 14, FIG. 15 depict the intermediate states, whereas in the transition between FIG. 10, FIG. 11 and FIG. 14, FIG. 15, respectively, the flow relations are being changed as described above. It should be noted, that the system in FIG. 13 to FIG. 16 can be operated in the mode, in which a part or even the entire flow coming out of the first sample separation unit 104 is discarded. This can be achieved by adjusting the flow rates flow rate ($2D_B$) and flow rate ($2D_A$), or adjusting the overpressure valve 180 or by blocking both fluidic vales 116 or by drawing the flow after the first sample separation unit 104 by a drawing pump (not shown).

It is also understood, that it is possible to use only one detector 120, which may be switchable between the outlets of the sample separation units 110, 112

FIG. 17, FIG. 18 and FIG. 19 show different configurations of a fluidic valve 116 forming part of a switching mechanism 114 of a multidimensional sample separation apparatus 10 according to an exemplary embodiment of the invention. Fluidic ports of a stator component of the fluidic valve 116 are indicated by reference numeral 191. Fluidic conduits (such as grooves) of the stator component of the fluidic valve 116 are indicated by reference numeral 193. Fluidic conduits (such as grooves) of a rotor component of the fluidic valve 116 are indicated by reference numeral 195. Thus, FIG. 17 to FIG. 19 show fluidic valve 116 forming the switching mechanism 114 together with a control unit 70 (see FIG. 1 to FIG. 3) according to an exemplary embodiment. According to FIG. 17, the flow in 1D and the flow in $2D_A$ are combined and directed to the second sample separation unit 110 for sample loading, while at the same time the flow in $2D_B$ flows along a separate flow path and directed to the third sample separation unit 112 to drive a separation. FIG. 18 shows the intermediate state, where both sample separation units 110, 112 are at the same pressure. Notably neither the first-dimension flow nor the flows in the second and third sample separation units 110, 112 are interrupted. According to FIG. 19, the flow in 1D and the flow in $2D_B$ are combined, while at the same time the flow in $2D_A$ flows along a separate flow path.

FIG. 20 shows a two-dimensional sample separation apparatus 10 with a fluidic valve 116 based switching mechanism 114 according to an exemplary embodiment of the invention.

FIG. 21 and FIG. 22 show a two-dimensional sample separation apparatus 10 with a fluidic valve 116 based switching mechanism 114 according to another exemplary embodiment of the invention in different switching states.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. A multidimensional sample separation apparatus for separating a fluidic sample, the sample separation apparatus comprising:

a first separation dimension for separating the fluidic sample and comprising a first fluid drive unit configured to drive the fluidic sample and a first sample separation unit configured to separate the fluidic sample;

a second separation dimension for further separating the fluidic sample separated by the first separation dimension, wherein the second separation dimension comprises a second fluid drive unit configured to drive the separated fluidic sample and a second sample separation unit and a third sample separation unit each configured to further separate the separated fluidic sample;

a switching mechanism configured to selectively switch an outlet of the first separation dimension in fluid communication with at least one selected one of the second sample separation unit and the third sample separation unit; and a control unit configured to control a pressure at inlets of the second sample separation unit and the third sample separation unit to be substantially the same at least at the time of the switching.

2. The sample separation apparatus according to claim 1, configured as a two-dimensional liquid chromatography sample separation apparatus.

3. The sample separation apparatus according to claim 1, wherein the control unit is configured for controlling pressure values at the inlets of the second sample separation unit and of the third sample separation unit to differ at least at the time of the switching by less than 10%.

4. The sample separation apparatus according to claim 1, wherein the control unit is configured to control a difference between pressure values at the inlets of the second sample separation unit and of the third sample separation unit to be, at least at the time of the switching, less than 100 bar.

5. The sample separation apparatus according to claim 1, wherein the control unit is configured to control pressure values at the inlet of the second sample separation unit and at the inlet of the third sample separation unit, at least at the time of the switching, to be at least 1000 bar.

6. The sample separation apparatus according to claim 1, wherein the control unit is configured to control pressure values at the inlet of the second sample separation unit and at the inlet of the third sample separation unit to be substantially the same over an entire operation of the sample separation apparatus.

7. The sample separation apparatus according to claim 1, wherein the control unit is configured to control pressure values at the inlet of the second sample separation unit and at the inlet of the third sample separation unit to be substantially at a predefined pressure value at least at the time of switching.

8. The sample separation apparatus according to claim 1, wherein the switching mechanism is configured to alternatingly couple the outlet of the first separation dimension to the second sample separation unit and the third sample separation unit, respectively.

9. The sample separation apparatus according to claim 1, wherein the switching mechanism comprises at least one fluidic valve being switchable under control of the control unit.

10. The sample separation apparatus according to claim 1, wherein the switching mechanism comprises at least one fluidic restriction being adjustable under control of the control unit.

11. The sample separation apparatus according to claim 1, comprising a first dimension detector coupled to an outlet of the first sample separation unit.

12. The sample separation apparatus according to claim 1, comprising a second dimension detector arranged downstream of the second sample separation unit and being configured for detecting the further separated fluidic sample.

13. The sample separation apparatus according to claim 1, comprising at least one fluidic restriction downstream of the third sample separation unit and configured to at least partially equilibrate a pressure at the second sample separation unit and a pressure at the third sample separation unit, wherein the at least one fluidic restriction comprises a feature selected from the group consisting of: a fluidic restriction switchable between outlets of the second sample separation unit and of the third sample separation unit; and two adjustable fluidic restrictions.

14. The sample separation apparatus according to claim 1, wherein the second fluid drive unit is configured to provide a flow rate being larger than another flow rate provided by the first fluid drive unit.

15. The sample separation apparatus according to claim 1, comprising a third fluid drive unit fluidically connected between an outlet of the first sample separation unit and an inlet of at least one of the second sample separation unit and the third sample separation unit.

16. The sample separation apparatus according to claim 15, wherein the third fluid drive unit is configured to dilute the pre-separated fluidic sample prior to the further separation.

17. The sample separation apparatus according to claim 15, wherein the control unit is configured to control the sample separation apparatus so that a sum of a flow rate of the first fluid drive unit and a flow rate of the third fluid drive unit is substantially the same as a flow rate of the second fluid drive unit.

18. The sample separation apparatus according to claim 15, wherein the first fluid drive unit, the second fluid drive unit and the third fluid drive unit are fluidically interconnectable or switchable via the switching mechanism.

19. The sample separation apparatus according to claim 1, wherein the switching mechanism is configured to place the second sample separation unit and the third sample separation unit in fluid communication with each other at least at the time of the switching.

20. A method of operating a multidimensional sample separation apparatus for separating a fluidic sample, the method comprising:
separating the fluidic sample by a first separation dimension comprising a first fluid drive unit for driving the fluidic sample and a first sample separation unit for separating the fluidic sample;
after separating the fluidic sample by the first separation dimension, supplying the separated fluidic sample to a second separation dimension for further separating the fluidic sample, wherein the second separation dimension comprises a second fluid drive unit for driving the separated fluidic sample and comprises a second sample separation unit and a third sample separation unit each of which being configured for further separating the separated fluidic sample; and
for further separating the fluidic sample by the second separation dimension, switching an outlet of the first separation dimension in fluid communication with at least one selected one of the second sample separation unit and the third sample separation unit so that an inlet pressure of the second sample separation unit and of the third sample separation unit is substantially the same at least at the point of time of switching.

* * * * *